United States Patent [19]

Berke

[11] 4,440,541

[45] Apr. 3, 1984

[54] POLARIZER: DICHROIC DYE IN ORIENTED POLYACRYLIC ACID/CHITOSAN COMPLEX SHEET

[75] Inventor: Carl M. Berke, Cambridge, Mass.

[73] Assignee: Polaroid Corporation, Cambridge, Mass.

[21] Appl. No.: 380,054

[22] Filed: May 20, 1982

[51] Int. Cl.³ .............................................. D06P 7/00
[52] U.S. Cl. ........................................... 8/489; 8/507; 8/509; 8/618; 8/645; 264/1.3; 264/288.4; 264/291
[58] Field of Search ...................... 264/288.4, 1.3, 291; 8/489, 509, 618, 645

[56] References Cited

U.S. PATENT DOCUMENTS

| | | | |
|---|---|---|---|
| 2,237,567 | 4/1941 | Land | 264/1.3 |
| 2,547,736 | 4/1951 | Blake | 264/286 |
| 3,254,561 | 6/1966 | Makas | 8/507 |
| 3,265,777 | 8/1966 | Marks et al. | 264/1.3 |
| 3,276,316 | 10/1966 | Makas | 264/2.6 |
| 3,386,979 | 6/1968 | Haas | 526/89 |
| 3,545,998 | 12/1970 | Buzzell | 8/485 |
| 4,301,067 | 11/1981 | Koshugi | 260/112.5 R |
| 4,396,646 | 8/1983 | Schuler et al. | 8/489 |

OTHER PUBLICATIONS

"Chitin," by R. A. A. Muzzarelli, (Pergamon Press, 1977), pp. 69 and 257.

Primary Examiner—A. Lionel Clingman
Attorney, Agent, or Firm—Philip G. Kiely

[57] ABSTRACT

A dichroic light polarizer comprising a sheet of molecularly oriented polyacrylic acid/chitosan complex having incorporated therein a dichroic dye.

6 Claims, 1 Drawing Figure

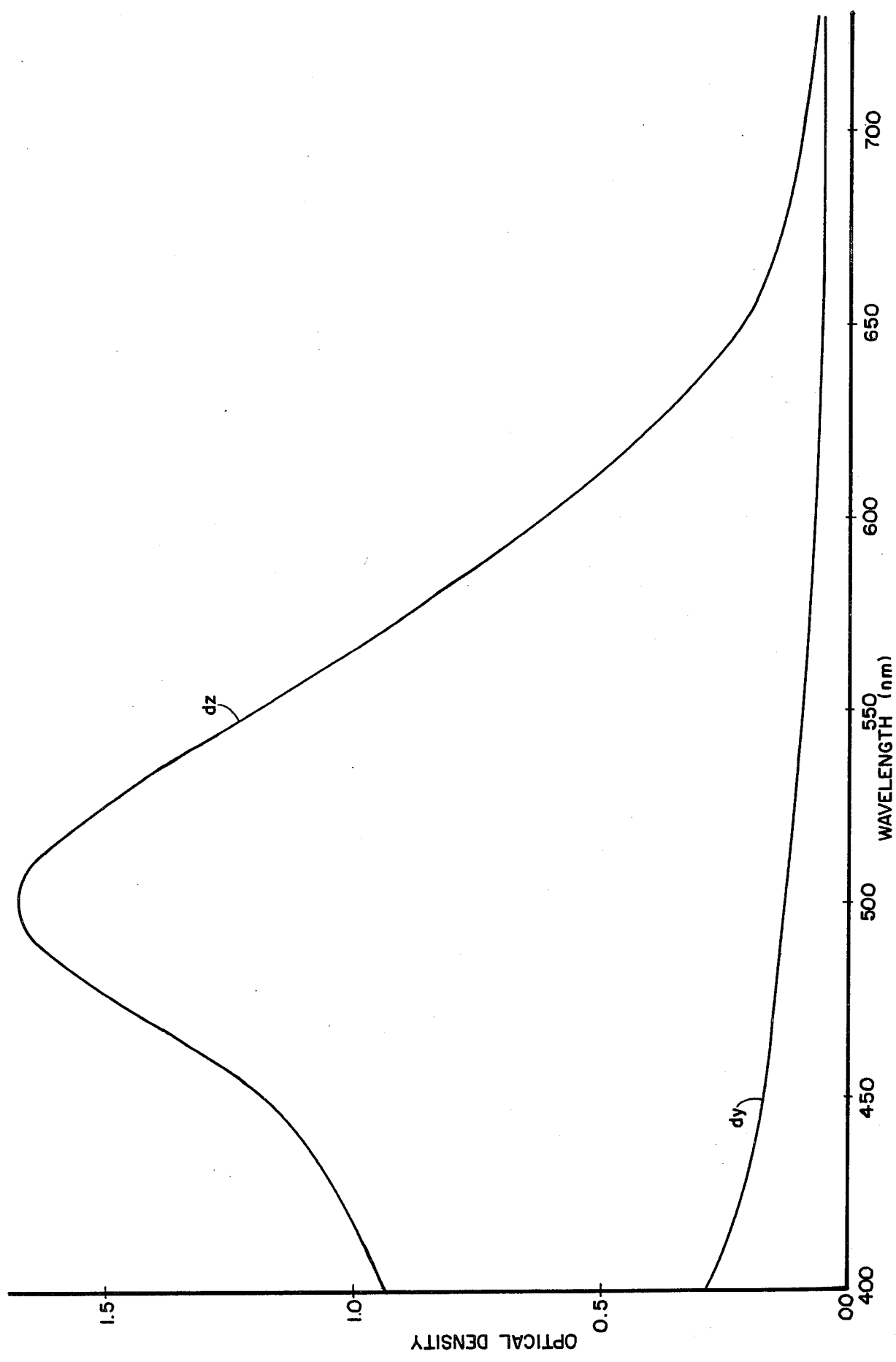

POLARIZER: DICHROIC DYE IN ORIENTED POLYACRYLIC ACID/CHITOSAN COMPLEX SHEET

BACKGROUND OF THE INVENTION

Dichroic light polarizers in use today generally comprise sheets of transparent polymeric material which have been treated to exhibit dichroism, e.g., by orienting the polymer chains by unidirectionally stretching a sheet of said polymer and then applying a dichroic dye. The component of incident light vibrating parallel to the direction of orientation will be transmitted, while the component of incident light vibrating perpendicular to the direction of orientation will be absorbed.

A commonly employed polarizer is designated H-sheet. It is prepared by stretching a sheet of transparent polyvinyl alcohol unidirectionally to orient the polymeric molecules and then dyeing the stretched sheet with a dichroic dye, e.g., iodine ink. The component of incident light parallel to the direction of orientation is transmitted with little absorption while the other components are absorbed. However, these polarizers often exhibit what is characterized as a "blue leak", i.e., they are not efficient polarizers in the blue region of the spectrum, e.g., about 400–500 nm.

SUMMARY OF THE INVENTION

The present invention is directed to a novel dichroic light polarizer comprising a sheet of molecularly oriented polyacrylic acid/chitosan complex having incorporated therein a dichroic dye and to methods of preparing such polarizers.

BRIEF DESCRIPTION OF THE DRAWING

The FIGURE is a graph of the principal optical density component versus wavelength for the two components of polarized light transmitted by a polarizer of the present invention.

DETAILED DESCRIPTION OF THE INVENTION

My copending application Ser. No. 355,679 filed Mar. 8, 1982 discloses a novel polyelectrolyte complex of polyacrylic acid and chitosan which is useful as a membrane or filter. It has now been found that the novel polyelectrolyte complex, when cast into a film, oriented and dyed with a dichroic dye provides a visible light polarizer.

The polymer employed in the present invention is prepared by the combination of weak acid-weak base polyelectrolyte, which combination can be formed into mechanically strong, free-standing films. The complex is prepared by combining, with mixing, an acidic solution of polyacrylic acid and an acidic solution of chitosan.

The term "chitosan", as used herein, is intended to refer to acid soluble, at least partially deacetylated chitin. Preferably, the degree of deacetylation is at least 75%, more preferably in excess of 85%. Although chitosan with a lesser degree of deacetylation can be employed, as the degree of deacetylation decreases and approaches chitin, the chitosan requires more acidic conditions for dissolution.

Any suitable acid may be employed to solubilize the polyacrylic acid and chitosan, provided the pH of the solution is below about 4. Suitable acids include sulfuric acid, hydrochloric acid, formic acid and acetic acid.

A self-supporting film may be formed from the solution of the complex by applying a coating of the solution on a suitable base or support. Any suitable coating means known to the art may be employed, including, but not limited to, slot coating, wire-wound rod and curtain coating. The particular base or support is not critical, provided the film may be stripped from the support. The coating of the complex is dried, preferably at elevated temperatures to provide an optically clear, colorless film which is than stripped from the support. Substantially any thickness film can be prepared.

If desired, as a coating aid, a non-ionic surfactant may be employed. The specific surfactant is not critical and conventional surfactants known to the art may be employed. The level of surfactant may range from about 0.01% by weight to about 5% by weight, of solution, preferably about 0.1% by weight depending upon the wetability of the surface of the particular support employed.

In a preferred embodiment, a plasticizer is employed in the film. The plasticizer may be incorporated into the film by addition to the solution prior to casting the film or, alternatively, the base film or membrane may be post treated by imbibition with the plasticizer. A particularly preferred class of plasticizers is the polyols. As example of suitable polyols mention may be made of glycerol, glucose, pentaerythritol, d-mannitol, ethylene glycol, and propylene glycol (polymeric). Glycerol is a particularly preferred plasticizer. The plasticizer level is not critical and may be employed satisfactorily over a wide range. In one embodiment the plasticizer is employed at a level of about 1% by weight, of polyelectrolyte solution.

Polyacrylic acid of substantially any molecular weight may be employed in forming the complexes of the present invention. As the molecular weight of the polyacrylic acid increases, a higher concentration of acid is necessary to maintain solubility of the complex. The higher the molecular weight of the polyacrylic acid, the greater the strength of the film or membrane. Preferably, polyacrylic acid having a molecular weight less than about 10,000 is employed, and more preferably about 5,000. At these lower molecular weight ranges acetic acid can be employed, simplifying the preparation techniques. The term "polyacrylic acid" as used herein is intended to include both polyacrylic acid and polymethacrylic acid.

The following non-limiting example illustrates the preparation of the polyelectrolyte complex.

EXAMPLE 1

1:1 Polyacrylic acid: Chitosan Complex

To 203 g of 3.8% chitosan in 4% aqueous acetic acid was added 47.5 g of glacial acetic acid, 9 g of 50% low molecular weight (about 5000) polyacrylic acid in water (GOODRITE K-732, sold by G. F. Goodrich, Inc., Cleveland, Ohio), 4 g of glycerine and 1 g of a 10% solution (weight basis) of a monomeric surfactant, TRITON X-100, (an octylphenoxy polyethoxy ethanol, sold by Rohm and Haas Company, Philadelphia, Pa.) was added with rapid stirring. A clear, homogeneous, amber solution resulted.

EXAMPLE 2

An approximately 2 mil thickness film was prepared by coating on a glass plate the solution prepared in Example 1. The coating was dried by heated air. The film was stripped from the glass plate, mounted in a frame, soaked for 1 min. in water at room temperature, then stretched uniaxially to twice its original length. The oriented film was stained by immersion in a solution comprising 5.45 g iodine, 36.9 g of potassium iodide and 900 g of water for 10 sec. The film was then rinsed with water and dried. The polarizer exhibited a dz $D_{max}$=495 nm, and a dichroic ratio of 8 at $_{max}$. The extinction color was crimson red.

EXAMPLE 3

A polarizer was prepared according to the procedure of Example 2 except that the oriented film was stained by immersion in the iodine solution for 30 seconds. The polarizer exhibited a dz $_{max}$=400 nm, and a dichroic ratio of $\geq 4$ from 400–630 nm.

The FIGURE is a graph of the principal optical density components plotted against wavelength for the polarizer of Example 2. The components of optical density, labeled dz and dy represent the maximum and minimum transmission densities, respectively, that can be obtained when the polarizers are measured against an incident beam of plane polarized light.

It should be noted that the novel polarizers of the present invention do not require any post-treatment for stabilization.

In an alternative embodiment, a polymer, such a polyvinyl alochol may be included in the film to fill in the red light leak at extinction which is illustrated in the FIGURE.

I claim:

1. A dichroic light polarizer comprising a molecularly oriented sheet of a polyacrylic acid/chitosan polyelectrolyte complex dyed with a dichroic dye.

2. The product of claim 1 wherein said complex is a 1:1 polyacrylic acid:chitosan complex.

3. The product of claim 1 wherein said dichroic dye is an iodine ink.

4. The product of claim 1 which includes polyvinyl alochol.

5. The product of claim 1 which includes a plasticizer.

6. The product of claim 5 wherein said plasticizer is a polyol.

* * * * *